United States Patent
Visvanathan et al.

(10) Patent No.: US 10,496,290 B1
(45) Date of Patent: Dec. 3, 2019

(54) METHOD AND SYSTEM FOR WINDOW-BASED CHURN HANDLING IN DATA CACHE

(71) Applicant: EMC IP Holding Company LLC, Hopkinton, MA (US)

(72) Inventors: Satish Visvanathan, San Jose, CA (US); Rahul B. Ugale, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 15/485,033

(22) Filed: Apr. 11, 2017

(51) Int. Cl.
| | |
|---|---|
| G06F 3/00 | (2006.01) |
| G06F 3/06 | (2006.01) |
| G06F 12/12 | (2016.01) |
| G06F 12/0891 | (2016.01) |

(52) U.S. Cl.
CPC .......... *G06F 3/0616* (2013.01); *G06F 3/0613* (2013.01); *G06F 3/0652* (2013.01); *G06F 3/0659* (2013.01); *G06F 3/0679* (2013.01); *G06F 12/0891* (2013.01); *G06F 12/12* (2013.01); *G06F 2212/1024* (2013.01); *G06F 2212/222* (2013.01); *G06F 2212/60* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 5,546,389 | A * | 8/1996 | Wippenbeck | G06F 5/10 370/412 |
| 6,892,249 | B1 * | 5/2005 | Codilian | G06F 3/04847 710/5 |
| 8,621,178 | B1 * | 12/2013 | Lazar | G06F 12/0223 711/117 |
| 8,904,093 | B1 * | 12/2014 | Nishimoto | G06F 12/0871 711/103 |
| 9,606,937 | B1 * | 3/2017 | Marathe | G06F 12/122 |
| 2002/0116441 | A1 * | 8/2002 | Ding | G06F 9/5011 718/105 |
| 2012/0079232 | A1 * | 3/2012 | Hinton | G06F 12/0292 711/207 |
| 2014/0244899 | A1 * | 8/2014 | Schmier | G06F 3/0616 711/103 |
| 2017/0083463 | A1 * | 3/2017 | Kachare | G06F 13/28 |

* cited by examiner

*Primary Examiner* — David Yi
*Assistant Examiner* — Craig S Goldschmidt
(74) *Attorney, Agent, or Firm* — Womble Bond Dickinson (US) LLP (57) ABSTRACT

According to some embodiment, a backup storage system receives a request from a client for writing a data segment associated with a file object stored to a storage system. In response to the request, the system writes the data segment to one of a plurality of storage units of the storage system. The system determines whether an amount of access to a solid state device (SSD) operating as a cache memory device exceeds an access threshold based on a time window distribution. The system throttles access to the SSD for caching data in response to determining that the amount of access to the SSD has exceeded the access threshold.

22 Claims, 8 Drawing Sheets

METHOD AND SYSTEM FOR WINDOW-BASED CHURN HANDLING IN DATA CACHE

FIELD OF THE INVENTION

Embodiments of the present invention relate generally to data storage systems. More particularly, embodiments of the invention relate to method and system for window-based churn handling in data cache.

BACKGROUND

Though there are numerous media options, the classic storage hierarchy is often described as hard disk drives (HDDs) providing slow, persistent storage and dynamic random access memory (DRAM) situated closer to processors providing fast, volatile storage. Flash-based solid state devices (SSDs) became available with latency and price between DRAM and HDD, though with limited endurance.

Traditional computer architectures include primary storage systems and backup (data recovery) storage systems. Typically when a primary system fails, data from storage system is replicated to the primary system. While replicating, it may be desirable to simultaneously access data directly, i.e., random access, from the storage system. Because of long latency of HDDs and high cost of DRAM, it is desirable to integrate SSDs as a caching layer in a cache hierarchy for improved performance.

A challenge is to build a backup storage system with a SSD cache layer balancing cost and performance. Because SSD has limited number write-erase cycles, another challenge is to limit write-erase cycles (churn) of the SSD cache to improve the useful life span of SSD devices.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a storage system may integrate solid state devices (SSD) as a caching layer for better random access performance in comparison with a storage system having only traditional spinning drives (e.g., traditional magnetic rotating disks). For example, SSDs can deliver about 500× more input/output operations per second (IOPS) than spinning drives but also have 5× the cost. SSDs, as well as other forms of flash memory, however, have a limited number of write-erase cycles after which a given region of memory cannot be rewritten. In one aspect, the storage system receives a request from a client for writing a data segment associated with a file object stored to a storage system. In response to the request, the storage system writes the data segment to one of a plurality of storage units of the storage system. The storage system determines whether an amount of access to a solid state device (SSD) operating as a cache memory device exceeds an access threshold based on a time window distribution. The storage system throttles access to the SSD for caching data in response to determining that the amount of access to the SSD has exceeded the access threshold.

According to another aspect of the invention, with respect to throttling access to the SSD for caching data, the storage system determines whether the data segment is associated with a top hot file region. The storage system writes of the data segment in a first of a plurality of write-evict units (WEUs) stored in the SSD for caching data in response to determining that the data segment is associated with the top hot file region. Otherwise, discarding the data segment such that the data segment is not written to the SSD.

Figure 1:
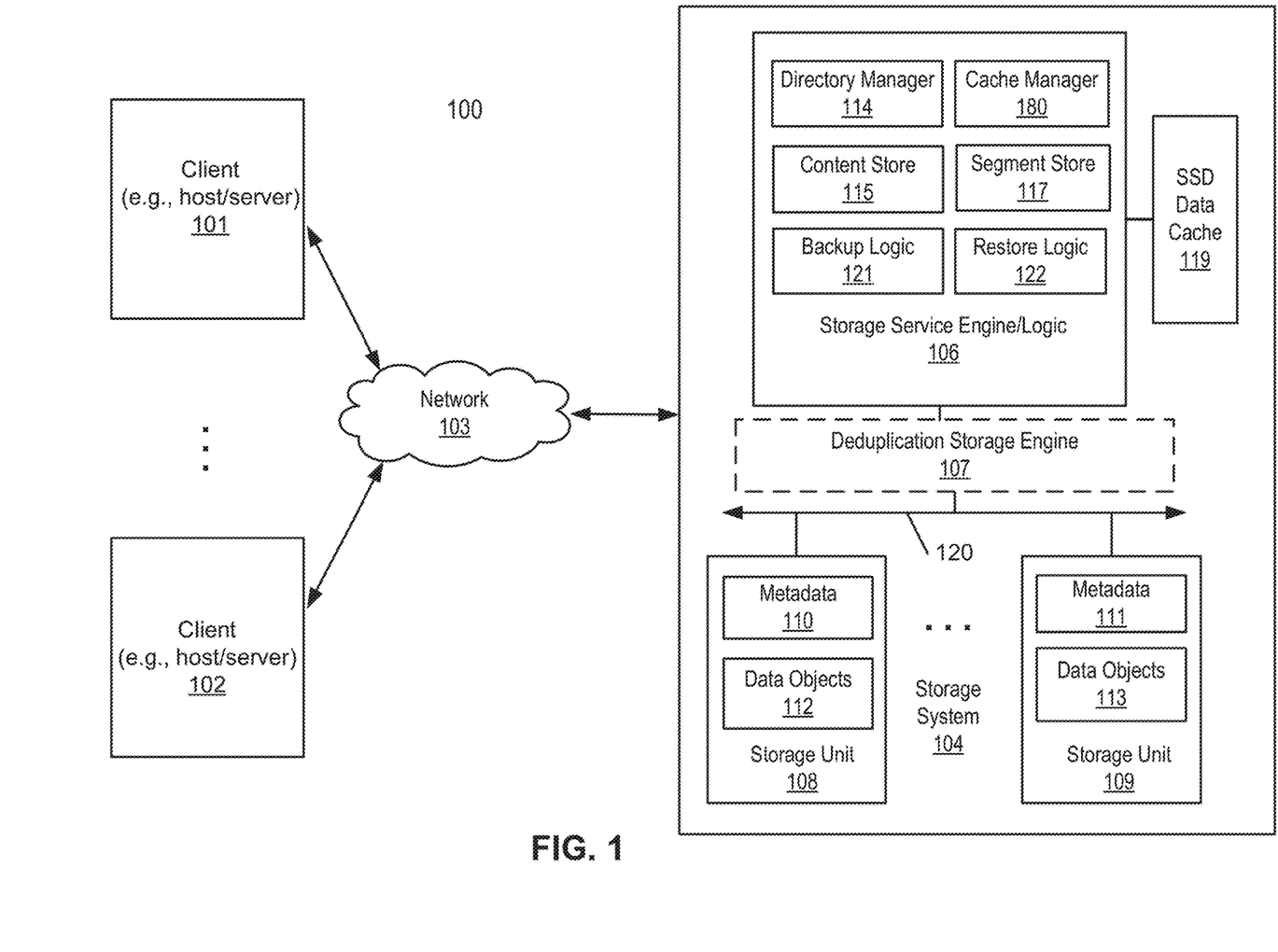
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, optional restore logic 122, and cache manager 180. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117) and/or SSD data cache 119. Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. Cache manager 180 is configured to manage access of a cache memory device, such as SSD device 119 operating as a cache memory device with respect to storage units 108-109.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
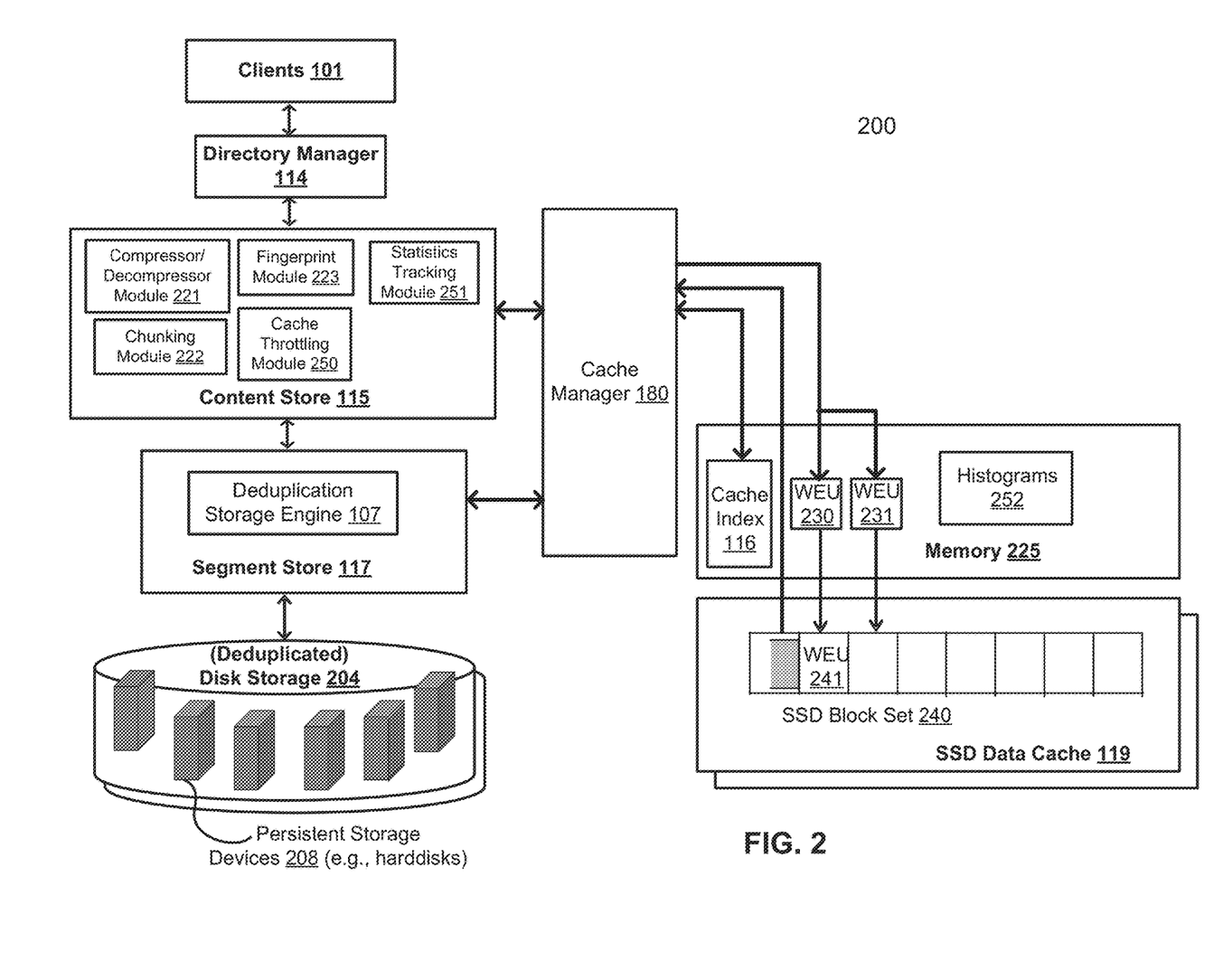
FIG. 2 is a block diagram illustrating example architecture of a storage system according to one embodiment of the invention.

FIG. 2 is a block diagram illustrating example architecture of a storage system according to one embodiment of the invention. System 200 may be implemented as a part of storage system 104 of FIG. 1. Referring to FIG. 2, storage system 200 includes, but is not limited to, one or more clients 101 communicatively coupled to directory manager 114 over a network (not shown). Directory manager 114 is communicatively coupled to content store 115. Directory manager 114 may be executed by a processor to provide a client interface to access files, via file handles, from the storage system. In addition, cache manager 180 is coupled to content store 115 and segment store 117 for accessing one or more SSD devices of SSD data cache 119.

At the bottom of FIG. 2 is disk storage 204 for storage of data. Disk storage 204 may be deduplicated and partitioned into containers (not shown). Each container may be made up of multiples of persistent storage devices 208, which may be implemented by spinning hard drives for a large capacity. Disk storage 204 may also contain file recipes, including file handles, fingerprints of data, and fingerprints of metadata such as nodes of a Merkle tree. Disk storage 204 may be one or more storage units 108-109 of storage system 104 of FIG. 1.

SSD data cache or cache 119 is a persistent cache memory device (such as a solid state device, SSD or flash memory), or simply referred to as cache, to accelerate performance. In cache 119, data are stored and evicted using a basic data structure referred to as a write-evict unit (WEU), such as WEU 241 of FIG. 2. WEU is a data unit that is written, erased, and/or evicted as a whole unit into and from SSD data cache 119. Content store 115 is configured to evict, via cache manager 180, WEUs no longer needed and free space to cache WEUs for new requests. The need of a WEU stems from the fact that cache 119 has limitations different from spinning hard disks, for example, a SSD storage unit must be explicitly erased before being overwritten, and the unit of erasure (up to MB(s) in size) is much larger than the unit of individual writes in disk storage (e.g., 4 kilobytes). In addition, writes wear out the SSD storage over time; therefore, less frequent write is more desirable. Here, a WEU unit may be configured to match a erasure unit of SSD devices of cache 119.

Furthermore, WEU as its basic data structure may be different from data structures such as chunks used in containers of the underlying disk storage 204. WEU is formed by multiple (and compressed) file extents or segments, which may be comprised of fixed-size blocks representing consecutive bytes (often many kilobytes) according to one embodiment of the invention. The consecutive bytes are within a single file in one embodiment. Extents may be the same as or different from file chunks depending on implementation. An extent may be an access unit size (the unit of read from the cache) that is performed by cache 119 in response to a request to access a file block of a file. A block (also referred to as a file block) is a data unit of each IO request to read or write to the underlying storage system. In this example, data requested by a higher file system layer (such as NFS) is in the form of block requests, which are converted to extent requests in the cache, while data being written in cache 119 is in a form of a WEU. A WEU, such as WEU 241, includes multiple extents, each of which is compressed therein where each extent can be independently read and accessed to satisfy read requests from the higher layers of the file system. The size of a WEU may be configured to match an erasure unit size of cache 119, which depends upon the specification or characteristics of cache 119. As a result, the lifespan of the cache 119 can be improved.

Memory 225 may be part of system memory of a storage system such as storage system 104 of FIG. 1. Memory 225 may be dynamic RAM (DRAM) or non-volatile RAM (NVRAM) or a combination thereof in one embodiment. Memory 225 contains cache index 116, which interacts with content store 115 (to index Merkle tree segments stored in cache 119 by storing portions of fingerprints of these segments in cache index 116) to accelerate reading from and writing data to cache 119. Cache index 116 interacts with WEUs 230-231 and WEU 241 for caching file extents in and evicting from cache 119 to accelerate system performance.

Segment store 117 may be part of storage service engine/logic of storage system 104, such as storage logic 106 of storage system 104 of FIG. 1. Segment store 117 may contain deduplication storage engine 107 in one embodiment. Segment store 117 interacts with content store 115 to store/retrieve data segments/chunks to/from disk storage 204. Segment store 117 may interact with memory 225 to store data segments that is retrieved from disk storage 204 to SSD data cache 119 for subsequent access.

Content store 115 may be part of storage service engine/logic of storage system 104, such as storage logic 106 of storage system 104 of FIG. 1. Content store 115 includes compressor/decompressor module 221, chunking module 222, fingerprint module 223, cache throttling module 250, and statistics tracking module 251 in one embodiment. Content store 115 interacts with segment store 117, memory 225, cache 119, and directory manager 114 in one embodiment. For example, when data, such as a file, is read by a client, content store 115 receives a data segments read request via directory manager 114. Content store 115 may identify fingerprints associated with the file segments by traversing a file Merkle tree. In another embodiment, directory manager 114 traverses a file Merkle tree to identify the fingerprints. Content store 115 looks up cache index 116 from memory 225 to identify an index entry based on the fingerprints to obtain information about previously stored segments. An index entry may include information such as WEU identifier, physical offset, and content type L0/LP, associated with the physical location of the WEU storing the requested data segment. Content store 115 accesses cache 119 via cache manager 180 to retrieve a compressed data segment based on index entry information. Content store 115 extracts and decompresses the compressed data segment and returns the data segment to the client without accessing disk storage 204.

In one embodiment, in response to determining that a cache index entry does not exist in cache index 116, content store 115 looks up in a second index (not shown), such as index 204 of FIG. 2, based on the fingerprint of the requested data segment to identify a container ID identifying a container storing the requested data segment in disk storage 204 (i.e., one or more storage units 108-109 of FIG. 1). The second index may be stored in memory 225 or in disk storage 204. Content store 115 retrieves compressed data segment via segment store 117 from an identified container of a storage unit, decompresses, and returns the retrieved data segment to the client.

In addition, the retrieved decompressed data segment is further divided into segments for storage via chunking module 222. Compressor/decompressor module 221 of content store 115 compresses the segments and content store 115 stores them into one or more WEUs, such as WEUs 230-231. WEUs 230-231 are then cached via cache manager 180 into SSD data cache 119. Content store 115 subsequently updates cache index 116 by inserting a new entry in cache index 116 to map the fingerprint of the data segment to one or more WEU IDs (e.g., WEUs 230-231) of WEUs to be stored in SSD data cache 119.

In one embodiment, cache index 116 includes a number of index entries, each entry corresponds to one of a number of segments stored in cache 119. Each entry of cache index 116 contains a fingerprint of the underlying segment or a portion thereof, and at least the information to map the fingerprint to a physical storage location of a corresponding WEU in the SSD device, i.e., physical block or WEU ID, and a physical offset.

In one embodiment, index 204 of FIG. 2 includes a number of index entries, each entry mapping a fingerprint of a corresponding data segment to a container ID identifying a container of the storage unit storing the corresponding data segment, i.e., container ID of one or more containers of disk storage 204 storing a corresponding data segment. In one embodiment, cache 119 stores a number of WEUs, such as WEU 241, such that the WEUs are written, erased, and/or evicted as a whole unit into and from cache 119 altogether.

Cache throttling module 250 throttles input/output (IO) access to SSD data cache 119 in response to a time window distribution (e.g., time window distribution 400 of FIG. 4 as discussed herein below). For example, applications performing high read/write ratio, such as 80/20 read/write ratio, may need to perform significant overwrite operations on a SSD (e.g., overwrite operations of LP segments stored in SSD data cache 119), thereby causing significant churn and faster wear on SSD data cache 119. To mitigate this issue, access to the SSD data cache 119 may be throttled to a certain threshold so that areas of the SSD data cache 119 can be evenly accessed over time to prolong the life of the SSD data cache 119.

Accordingly, in one embodiment, based on the time window distribution, cache throttling module 250 may determine whether an amount of access (e.g., read or write access) of SSD data cache 119 has exceeded a predetermined or desired access threshold (e.g., 1 write per day (WPD) or 3 WPD). If so, cache throttling module 250 may effectively throttle access to SSD data cache 119 to achieve the desired access threshold. In some embodiments, cache throttling module 250 may cache only top few "hot" file regions in SSD data cache 119. In some embodiments, cache throttling module 250 may simply discard or drop "cold" file regions such that they are not written to SSD data cache 119.

With respect to throttling of access to SSD data cache 119, memory 225 includes histograms 252 generated by statistics tracking module 251. For each file stored in the storage system, one or more histogram buckets corresponding to one or more regions of each file is created and updated over the life of the file. Statistics tracking module 251 and histograms 252 may keep track of frequency of access (read/write) over a period of time for the one or more regions of each file. For example, disk storage 204 may contain terabytes of data files. Data files may be divided into 100 GB files, each 100 GB file having 100 1 GB regions such that each 1 GB region may be associated with a histogram bucket. Histogram buckets may contain a timestamp and types of access, i.e., read or write access, for each file region. Histogram buckets may be updated each time a corresponding file region is accessed from disk storage 204, such that histograms 252 may plot a hierarchy of "hot" regions (frequency and recency of read/write access) of each file stored in disk storage 204. Histograms 252 may maintain records of file object for a predetermined time period in the past. Periodically, the top 10-20% of hot file regions may be cached in SSD data cache 119 via cache manager 180. In another embodiment, segments that are read/write from "cold" file regions or not associated with frequently accessed file regions are dropped such that they are not written to cache 119. Note that file regions of 1 GB is illustrated in the above example for purposes of demonstration, however, each file regions may be of any size.

In one embodiment, when the miss rate of the SSD data cache or cache 119 is high for client requests, storage system may populate the cache aggressively, i.e., any segment read/write from storage system are populated to cache 119 if they are not previously stored in cache 119. Hit (or miss) rate refers to a probability that a requested data segment is previously stored in (or absent from) a respective device. However, when a SSD churn is high or a hit rate of cache 119 is above 50% then a write strategy may be employed to reduce write-erase cycles. SSD churn refers to the number of unnecessary writes or write-erases of a SSD device over a specified time period, such that the data is almost never used. A write strategy may be employed when certain conditions are met, for example, when data are read from disk storage, such as disk storage 204, and the data is stored in a region of a top 10% of "hot" file regions, then the retrieved data segments may be written to SSD data cache 119. In another embodiment, the percentage of "hot" file regions may be automatically adjusted to correspond to some statistics such as a hit rate or SSD churn rate of cache 119. A write strategy limiting write-erase cycles ensures SSD devices of SSD data cache 119 do not fail prior to its intended life since frequent write-erase will reduce SSD devices' lifetime. The "hotness" or frequency of access of a file or regions of a file and/or a miss rate of cache 119 determines whether segments of the files should be populated to SSD data cache 119. A miss rate of cache 119 may be a global cache miss rate, i.e., of the entire cache, or window based, i.e., limited to a certain region of the SSD data cache.

In one embodiment, segments are written to SSD data cache 119 for segments previously stored in disk storage 204 of FIG. 2. For example, when client 101 requests data from the storage system 200, content store 115 looks up cache index 116 and determines whether data segments are previously stored in SSD data cache 119. If it is not, content store 115 retrieves the compressed segments from disk storage 204 via segment store 117. Upon retrieval, the compressed segments may or may not be the same compression size or compression type of the SSD data cache. Content store 115 decompresses the retrieved segments, divides the segments into segments compatible with SSD data cache 119, compresses the segments, and stores them in SSD data cache 119. One or more entries are added to cache index 116 to reflect the new segments stored in SSD cache 119 to map a fingerprint of the data segments to a storage location of the WEU in an SSD device of cache 119.

In one embodiment, storage system may examine a data stream associated with the data segment to determine an access pattern of the data stream. For example, storage system 200 of FIG. 2 when randomly accessed will have a different access pattern than when storage system 200 is accessed to restore a snapshot of a client 101. When storage system determines a access pattern is a recovery then the segments read from storage disk 204 are not stored in cache 119. When the access pattern is determined to be random, then it may be stored in cache 119 for subsequent access when a write strategy condition is met. For example, a write strategy condition may be that the segment to be stored resides on a top 10-20% of "hot" file regions. In another embodiment, in response to a second request to read a second segment, storage system determines whether cache 119 stores the second segment. Content store 115 retrieves the second data segment from disk storage 204 if cache 119 does not contain the second data segment and caches the second data segment in cache 119 if the second data segment is associated with a second file region that is frequently accessed or "hot" file region.

In another embodiment, segments are written to SSD data cache 119 in a backup operation. For example, when client 101 backs up data, data segments may be an incremental backup representing a difference between a first snapshot and a second snapshot of backups taken at different points in time. Snapshot is an image of an instance in time of a backup system. In this scenario, chunking module 222 of content store 115 divides the difference or delta segments into segments compatible with SSD data cache 119. Compression/decompression module 221 compresses the segments and the segments are written to SSD data cache 119. Cache index 116 is updated to reflect the new segments stored in SSD data cache 119. In another embodiment, the incremental backup data is not stored in SSD data cache 119 when certain conditions are met, for example, when SSD data cache 119 hit rate reaches a predefined threshold.

Figure 3:
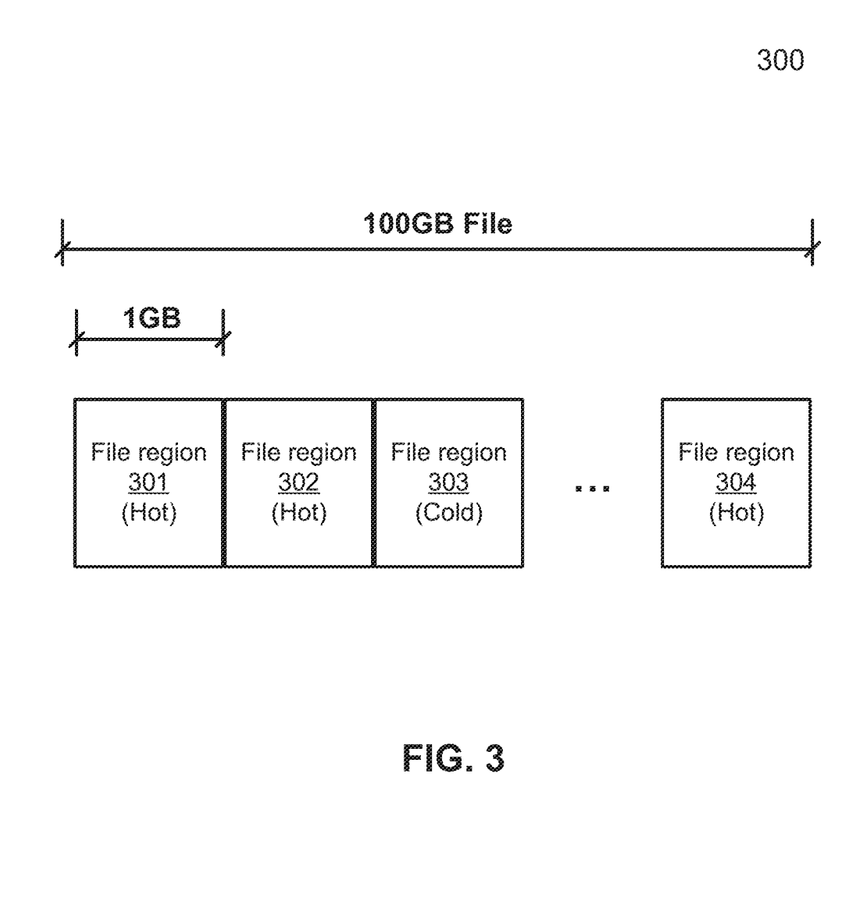
FIG. 3 is a block diagram illustrating an example file from storage disk according to one embodiment of the invention

FIG. 3 is a block diagram illustrating an example file from storage disk according to one embodiment of the invention. In this scenario, storage system predetermines when to write to SSD data cache to limit the number of write-erase cycles to SSD data cache. File 300 may be a logical grouping of deduplicated compressed segments stored in storage disk 204 of FIG. 2, for example, with a file size of 100 GB having file regions of size 1 GB. Each of the file regions' access patterns may be recorded in a corresponding histogram, such as histograms 252 of FIG. 2. For example, statistics tracking module 251 of FIG. 2 may record access statistics of each of the file regions stored on storage disk 204, or a combination of the file regions. The statistics are stored in histograms 252. Access statistics may include a frequency of write/read, a number of IOs of the file regions. The file region size of 1 GB and file size of 100 GB should not be construed as limiting, e.g., the file and data cache sizes may be any suitable sizes.

Referring to FIG. 3, histograms may record access statistics showing that file regions 301, 302, and 304 are hot regions, and file region 303 is a cold region. In this scenario, when read request is made to the storage disk 204 and the segments requested reside in file regions 301, 302, and 304, then retrieved segments are recorded on SSD data cache 119 for subsequent access. In another embodiment, when read request is made to the storage disk 204 and the segments requested reside in file regions 301, 302, and 304, and file regions 301, 302, and 304 are top 10% of hot regions of file 300, only then will the segments be recorded on cache 119 for subsequent access.

Figure 4:
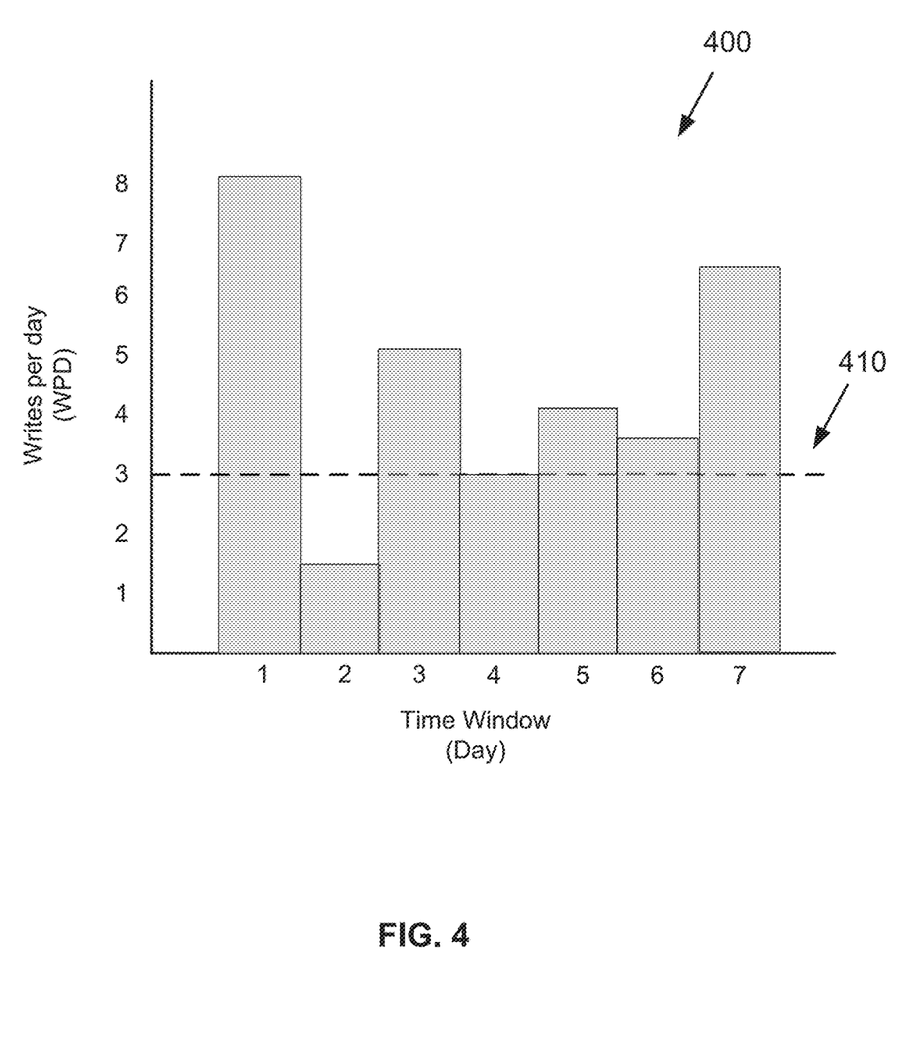
FIG. 4 is a diagram illustrating an example of a time window distribution according to one embodiment of the invention.

FIG. 4 is a diagram illustrating an example of a time window distribution according to one embodiment of the invention. Referring to FIG. 4, time window distribution 400 is represented by a number of WPD (y-axis) performed on a SSD (e.g., SSD data cache 119 of FIG. 2) over a time window (i.e., number of days (x-axis)). In the example of FIG. 4, the time window is taken over a period of seven (7) days, although the time window may be taken over any suitable period of time. Also in FIG. 4, desired SSD access threshold is set at 3 WPD (as indicated by dotted line 410), although the access threshold may be set at any suitable number of WPD.

As shown in FIG. 4, eight (8) WPD are performed on the SSD on day 1, 1.5 WPD are performed on day 2, five (5) WPD are performed on day 3, three (3) WPD are performed on day 4, four (4) WPD are performed on day 5, 3.5 WPD are performed on day 6, and 6.5 WPD are performed on day 7. While bursty rate of access to the SSD (like the scenario in FIG. 4, e.g.) may be permitted, SSD usage however is to be effectively throttled such that the average number of WPD over a time window (e.g., 7 days) does not exceed the desired access threshold (e.g., 3 WPD). In some embodiments, a write bandwidth of the SSD can be determined to effectively write to the areas of the SSD and achieve the desired access threshold. For example, assume Y Mb/s (i.e., write bandwidth) for desired access threshold N WPD, and the SSD capacity is X. The formula to determine Y Mb/s is: Y=NX/(3600 seconds/hour*24 hours/day). Accordingly, if the SSD has a capacity of 500 GB and the desired access threshold is 3 WPD, for example, then the write bandwidth would be 18 Mb/s.

In some embodiments, if the number of WPD for a given day exceeds the desired access threshold (e.g., day 1 in FIG. 4), then SSD usage is to be throttled such that the number of WPD would fall below the desired access threshold on a subsequent day (e.g., day 2 in FIG. 4). In some embodiments, SSD usage may be throttled evenly such that the number of WPD does not exceed the desired access threshold for any given day in the time window.

Figure 5:
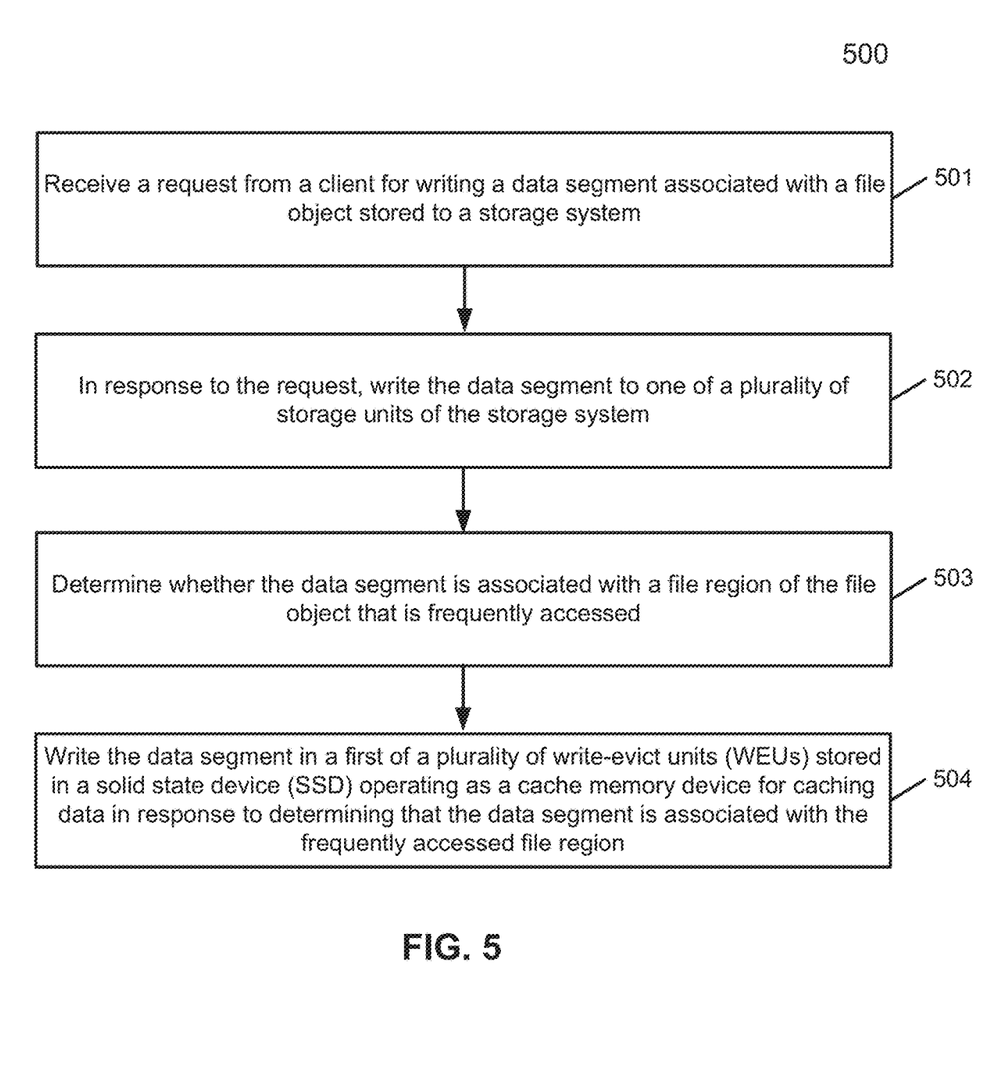
FIG. 5 is a flow diagram illustrating an overview of a method to write data segments effectively to a SSD data cache of a storage system according to one embodiment of the invention.

FIG. 5 is a flow diagram illustrating an overview of a method to write data segments effectively to a SSD data cache of a storage system according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by content store 115 of FIG. 2.

Referring to FIG. 5, at block 501, processing logic receives a request from a client for writing a data segment associated with a file object stored to a storage system. At block 502, in response to the request, the processing logic writes the data segment to one of a plurality of storage units of the storage system. At block 503, the processing logic determines whether the data segment is associated with a file region of the file object that is frequently accessed. At block 504, the processing logic writes the data segment in a first of a plurality of write-evict units (WEUs) stored in a SSD operating as a cache memory device for caching data in response to determining that the data segment is associated with the frequently accessed file region.

Figure 6:
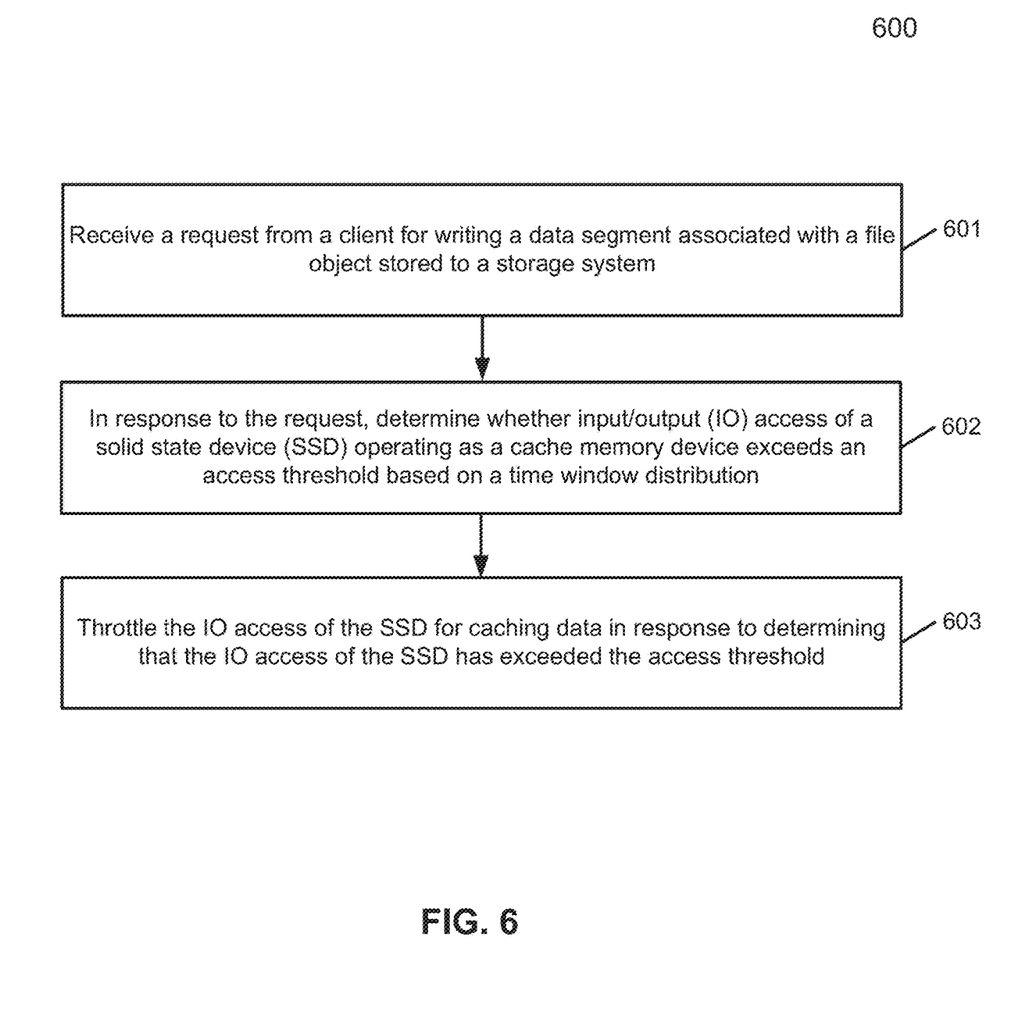
FIG. 6 is a flow diagram illustrating an overview of a method to throttle input/output (IO) access of a SSD for data caching according to one embodiment of the invention.

FIG. 6 is a flow diagram illustrating an overview of a method to throttle input/output (IO) access of a SSD for data caching according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by cache throttling module 250 of FIG. 2.

Referring to FIG. 6, at block 601, processing logic receives a request from a client for writing a data segment associated with a file object stored to a storage system. At block 602, in response to the request, the processing logic determines whether input/output (IO) access of a SSD operating as a cache memory device exceeds an access threshold based on a time window distribution. At block 603, the processing logic throttles the IO access of the SSD for caching data in response to determining that the IO access of the SSD has exceeded the access threshold.

Figure 7:
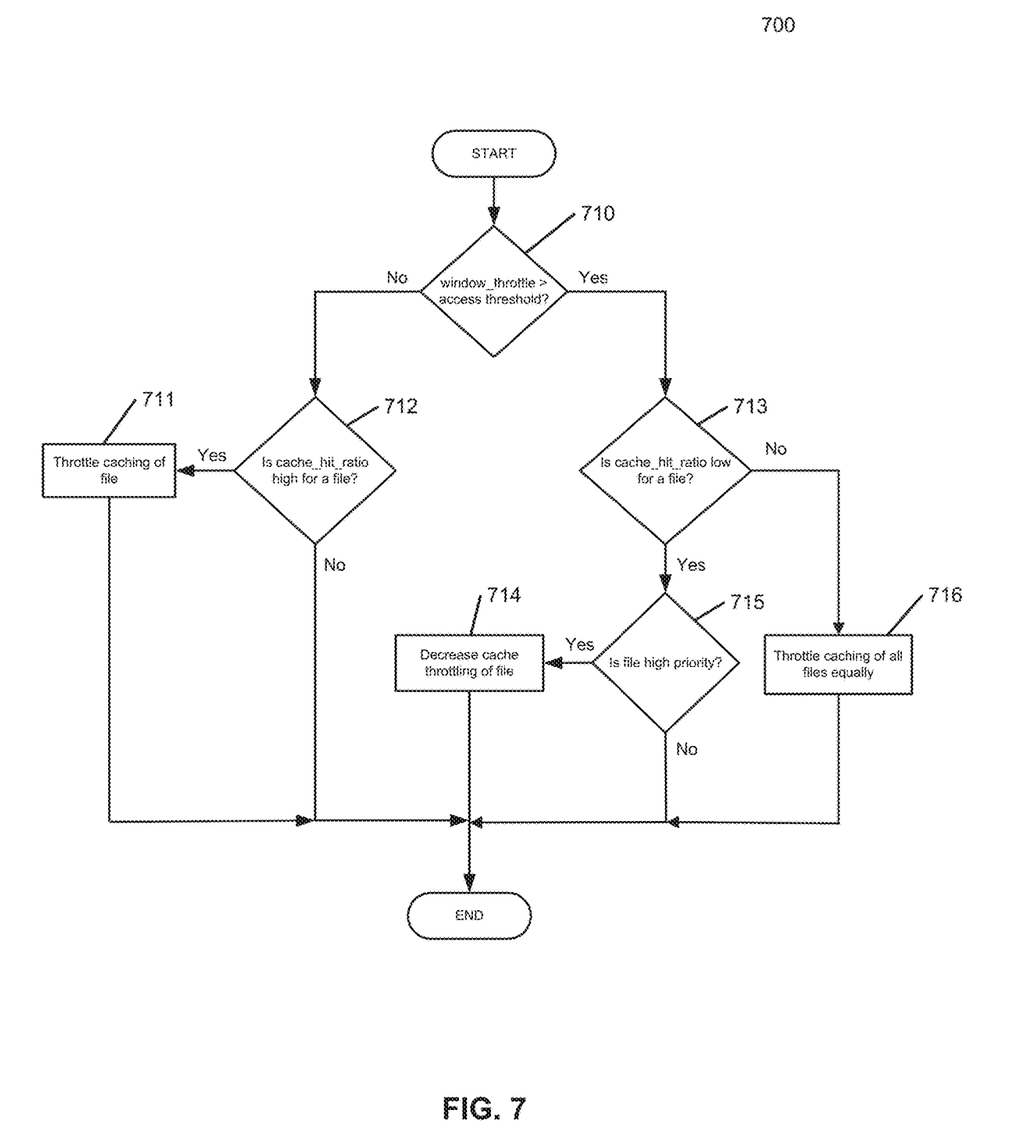
FIG. 7 is a flow diagram illustrating another method to throttle IO access of a SSD for data caching according to one embodiment of the invention.

FIG. 7 is a flow diagram illustrating another method to throttle IO access of a SSD for data caching according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by cache throttling module 250 of FIG. 2.

Referring to FIG. 7, at block 710 processing logic determines whether window_throttle (i.e., the amount of SSD access) exceeds an access threshold. If so, at block 713, the processing logic determines whether cache hit ratio is low for a file. Otherwise, at block 712, the processing logic determines whether cache hit ratio is high for the file. At block 712, if the cache hit ratio is high for the file, at block 711 the processing logic throttles caching of the file to the SSD. At block 713, if the cache hit ratio is low for the file, at block 715 the processing logic determines whether the file is a high priority file (e.g., file having top 10-20% hot file regions). Otherwise, at block 716 the processing logic throttles caching of all files equally. Returning to block 715, if the file is a high priority file, at block 714 the processing logic decreases cache throttling of the file.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
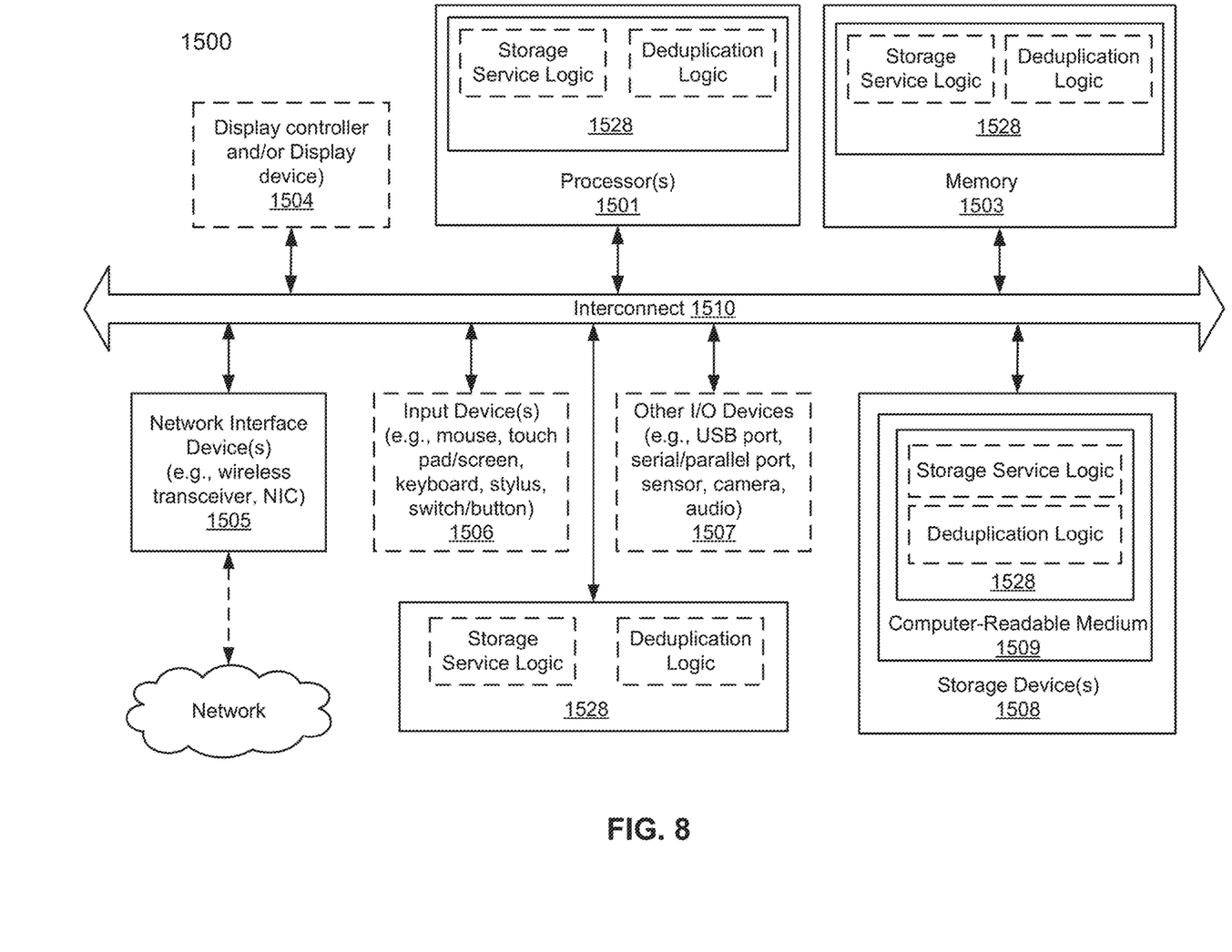
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for controlling access to a cache memory device, the method comprising:
   receiving a request from a client for writing a data segment associated with a file object stored to a storage system;
   in response to the request, writing the data segment to one of a plurality of storage units of the storage system;
   determining, in the storage system, a hierarchy of file regions of the file object based on access frequency and access recency of the file regions of the file object, wherein a first portion of the hierarchy of file regions is designated as top hot file regions based on a first percentage;
   calculating a miss rate of a solid state device (SSD) operating as a cache memory device based on a plurality of previous requests from the client;
   automatically adjusting, based on the calculated miss rate of the SSD, the first percentage to a second percentage, the second percentage used to determine a second portion of the hierarchy of file regions as top hot file regions of the file object;

determining whether an amount of access to a solid state device (SSD) operating as a cache memory device exceeds an access threshold based on a time window distribution, wherein the access threshold is a desired average of writes per day (WPD) to the SSD over a predetermined period of time; and throttling access to the SSD for caching data in response to determining that the amount of access to the SSD has exceeded the access threshold, including writing the data segment to the SSD in response to determining that the data segment is associated with a top hot file region in the second portion of the hierarchy of file regions, and discarding the data segment in response to determining that the data segment is not associated with a top hot file region in the second portion of the hierarchy of file regions.

2. The method of claim 1, wherein throttling access to the SSD for caching data comprises:

writing the data segment in a first of a plurality of write-evict units (WEUs) stored in the SSD for caching data in response to determining that the data segment is associated with the top hot file region.

3. The method of claim 1, wherein the time window distribution is a representation of a number of WPD associated with the SSD over the predetermined period of time.

4. The method of claim 1, wherein the access threshold is determined based on a ratio between a write bandwidth of the SSD and a capacity of the SSD.

5. The method of claim 4, wherein access to the SSD is effectively throttled such that a number of WPD for a particular day is less than or equal to the desired average of WPD.

6. The method of claim 1, wherein a write bandwidth of the SSD is determined based on the access threshold and a capacity of the SSD.

7. The method of claim 2, wherein the top hot file region is determined based on one or more histogram buckets corresponding to one or more file regions of the file object.

8. The method of claim 7, wherein each of the histogram buckets includes a timestamp and a type of access for a corresponding file region.

9. A non-transitory machine-readable medium having instructions stored therein, which when executed by a processor, cause the processor to perform operations for controlling access to a cache memory device, the operations comprising:

receiving a request from a client for writing a data segment associated with a file object stored to a storage system;

in response to the request, writing the data segment to one of a plurality of storage units of the storage system;

determining, in the storage system, a hierarchy of file regions of the file object based on access frequency and access recency of the file regions of the file object, wherein a first portion of the hierarchy of file regions is designated as top hot file regions based on a first percentage;

calculating a miss rate of a solid state device (SSD) operating as a cache memory device based on a plurality of previous requests from the client;

automatically adjusting, based on the calculated miss rate of the SSD, the first percentage to a second percentage, the second percentage used to determine a second portion of the hierarchy of file regions as top hot file regions of the file object;

determining whether an amount of access to a solid state device (SSD) operating as a cache memory device exceeds an access threshold based on a time window distribution, wherein the access threshold is a desired average of writes per day (WPD) to the SSD over a predetermined period of time; and throttling access to the SSD for caching data in response to determining that the amount of access to the SSD has exceeded the access threshold, including writing the data segment to the SSD in response to determining that the data segment is associated with a top hot file region in the second portion of the hierarchy of file regions, and discarding the data segment in response to determining that the data segment is not associated with a top hot file region in the second portion of the hierarchy of file regions.

10. The non-transitory machine-readable medium of claim 9, wherein throttling access to the SSD for caching data comprises:

writing the data segment in a first of a plurality of write-evict units (WEUs) stored in the SSD for caching data in response to determining that the data segment is associated with the top hot file region.

11. The non-transitory machine-readable medium of claim 9, wherein the time window distribution is a representation of a number of WPD associated with the SSD over the predetermined period of time.

12. The non-transitory machine-readable medium of claim 9, wherein the access threshold is determined based on a ratio between a write bandwidth of the SSD and a capacity of the SSD.

13. The non-transitory machine-readable medium of claim 12, wherein access to the SSD is effectively throttled such that a number of WPD for a particular day is less than or equal to the desired average of WPD.

14. The non-transitory machine-readable medium of claim 9, wherein a write bandwidth of the SSD is determined based on the access threshold and a capacity of the SSD.

15. The non-transitory machine-readable medium of claim 10, wherein the top hot file region is determined based on one or more histogram buckets corresponding to one or more file regions of the file object.

16. The non-transitory machine-readable medium of claim 15, wherein each of the histogram buckets includes a timestamp and a type of access for a corresponding file region.

17. A data processing system, comprising:

a processor; and a memory coupled to the processor to store instructions, which when executed by the processor, cause the processor to perform operations, the operations comprising:

receiving a request from a client for writing a data segment associated with a file object stored to a storage system;

in response to the request, writing the data segment to one of a plurality of storage units of the storage system;

determining, in the storage system, a hierarchy of file regions of the file object based on access frequency and access recency of the file regions of the file object, wherein a first portion of the hierarchy of file regions is designated as top hot file regions based on a first percentage;

calculating a miss rate of a solid state device (SSD) operating as a cache memory device based on a plurality of previous requests from the client;

automatically adjusting, based on the calculated miss rate of the SSD, the first percentage to a second percentage, the second percentage used to determine a second portion of the hierarchy of file regions as top hot file regions of the file object;

determining whether an amount of access to a solid state device (SSD) operating as a cache memory device exceeds an access threshold based on a time window distribution, wherein the access threshold is a desired average of writes per day (WPD) to the SSD over a predetermined period of time; and throttling access to the SSD for caching data in response to determining that the amount of access to the SSD has exceeded the access threshold, including writing the data segment to the SSD in response to determining that the data segment is associated with a top hot file region in the second portion of the hierarchy of file regions, and discarding the data segment in response to determining that the data segment is not associated with a top hot file region in the second portion of the hierarchy of file regions.

18. The data processing system of claim 17, wherein throttling access to the SSD for caching data comprises:

writing the data segment in a first of a plurality of write-evict units (WEUs) stored in the SSD for caching data in response to determining that the data segment is associated with the top hot file region.

19. The data processing system of claim 17, wherein the time window distribution is a representation of a number of WPD associated with the SSD over the predetermined period of time.

20. The data processing system of claim 17, wherein the access threshold is determined based on a ratio between a write bandwidth of the SSD and a capacity of the SSD.

21. The data processing system of claim 18, wherein the top hot file region is determined based on one or more histogram buckets corresponding to one or more file regions of the file object.

22. The data processing system of claim 21, wherein each of the histogram buckets includes a timestamp and a type of access for a corresponding file region.

* * * * *